United States Patent
Petro (10) Patent No.: US 10,640,324 B2
(45) Date of Patent: May 5, 2020

(54) EXPANDABLE WIDTH FILAMENT SPOOL

(71) Applicant: Mark A. Petro, Windsor (CA)

(72) Inventor: Mark A. Petro, Windsor (CA)

(*) Notice: Subject to any disclaimer, the term of this patent is extended or adjusted under 35 U.S.C. 154(b) by 132 days.

(21) Appl. No.: 15/718,238

(22) Filed: Sep. 28, 2017

(65) Prior Publication Data

US 2018/0086594 A1 Mar. 29, 2018

Related U.S. Application Data

(60) Provisional application No. 62/401,229, filed on Sep. 29, 2016.

(51) Int. Cl.
| | | |
|---|---|---|
| B65H 75/24 | (2006.01) |
| B65H 75/22 | (2006.01) |
| B65H 75/14 | (2006.01) |
| B65H 75/30 | (2006.01) |

(52) U.S. Cl.
CPC .......... *B65H 75/241* (2013.01); *B65H 75/14* (2013.01); *B65H 75/22* (2013.01); *B65H 75/30* (2013.01)

(58) Field of Classification Search
CPC .............................. B65H 75/241; B65H 75/30
See application file for complete search history.

(56) References Cited

U.S. PATENT DOCUMENTS

| | | | | |
|---|---|---|---|---|
| 4,570,869 A * | 2/1986 | Tsuji | ...................... | B65H 75/22 242/118.5 |
| 4,657,140 A * | 4/1987 | Zagar | ...................... | B65H 75/14 206/397 |
| 5,622,333 A * | 4/1997 | Jacques | ................ | B65H 75/241 242/118.5 |
| 6,736,349 B1 * | 5/2004 | Boisdon | ................. | B65H 75/22 242/118.61 |
| 8,702,026 B2 * | 4/2014 | Evans | ................... | B65H 75/241 242/395 |
| 2006/0086863 A1 * | 4/2006 | Couchey | ................ | B65H 75/18 242/610.6 |
| 2008/0315029 A1 * | 12/2008 | Eggen | .................... | B65H 49/22 242/557 |
| 2012/0325952 A1 * | 12/2012 | Evans | ................... | B65H 75/241 242/390.8 |
| 2017/0297856 A1 * | 10/2017 | Derrick | .................. | B65H 75/14 |

FOREIGN PATENT DOCUMENTS

| | | | | |
|---|---|---|---|---|
| CA | 2164386 A1 * | 6/1997 | ............. | B65H 75/22 |
| DE | 3810967 A1 * | 10/1989 | ............ | B65H 75/241 |
| DE | 19836144 A1 * | 2/2000 | ............. | B65H 75/14 |
| WO | 2016/019719 A1 | 2/2016 | | |

\* cited by examiner

*Primary Examiner* — William E Dondero
(74) *Attorney, Agent, or Firm* — Carlson, Gaskey & Olds, P.C.

(57) ABSTRACT

An expandable spool includes a first hub extending from a first flange and includes a first plurality of interlocking portions. A second hub extending from a second flange includes a second plurality of interlocking portions that is connectible to the first plurality of interlocking portions to define a spacing between the first flange and the second flange for holding material on the spool.

20 Claims, 7 Drawing Sheets

EXPANDABLE WIDTH FILAMENT SPOOL

CROSS REFERENCE TO RELATED APPLICATION

This application claims priority to U.S. Application No. 62/401,229 filed on Sep. 29, 2016.

BACKGROUND

A spool is utilized to hold thread, string, hose, cable, filament, wire or a variety of other materials for storage and operation. In one example, an additive manufacturing machine that form shapes and products layer by layer utilizes a filament plastic material that is stored and spools and fed into the machine. The filament is held on a spool of the machine that both stores the filament prior to use and advances the filament into the work space. Different filaments and different machines include different configurations to hold different sizes of spools and different quantities of filament material.

Additionally thin material such as wire may be utilized in other manufacturing processes including welding and coil winding. In each example, a spool is designed and built for each specific application. The width of the spool is typically fixed and may include features that correspond to a specialized machine or mount. Accordingly, material suppliers may need many different spool configurations and sizes to meet the needs of customers. The many different types, sizes and configurations of spools increase cost and complexity and require the storage, tracking and of many different spool configurations for different machines and different materials.

SUMMARY

An expandable spool according to an exemplary embodiment of this disclosure, among other possible things includes a first flange, a first hub extending from the first flange and a first plurality of interlocking portions. A second hub extending from a second flange includes a second plurality of interlocking portions. The first plurality of interlocking portions is connectible to the second plurality of interlocking portions to define a spacing between the first flange and the second flange for holding material on the spool.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
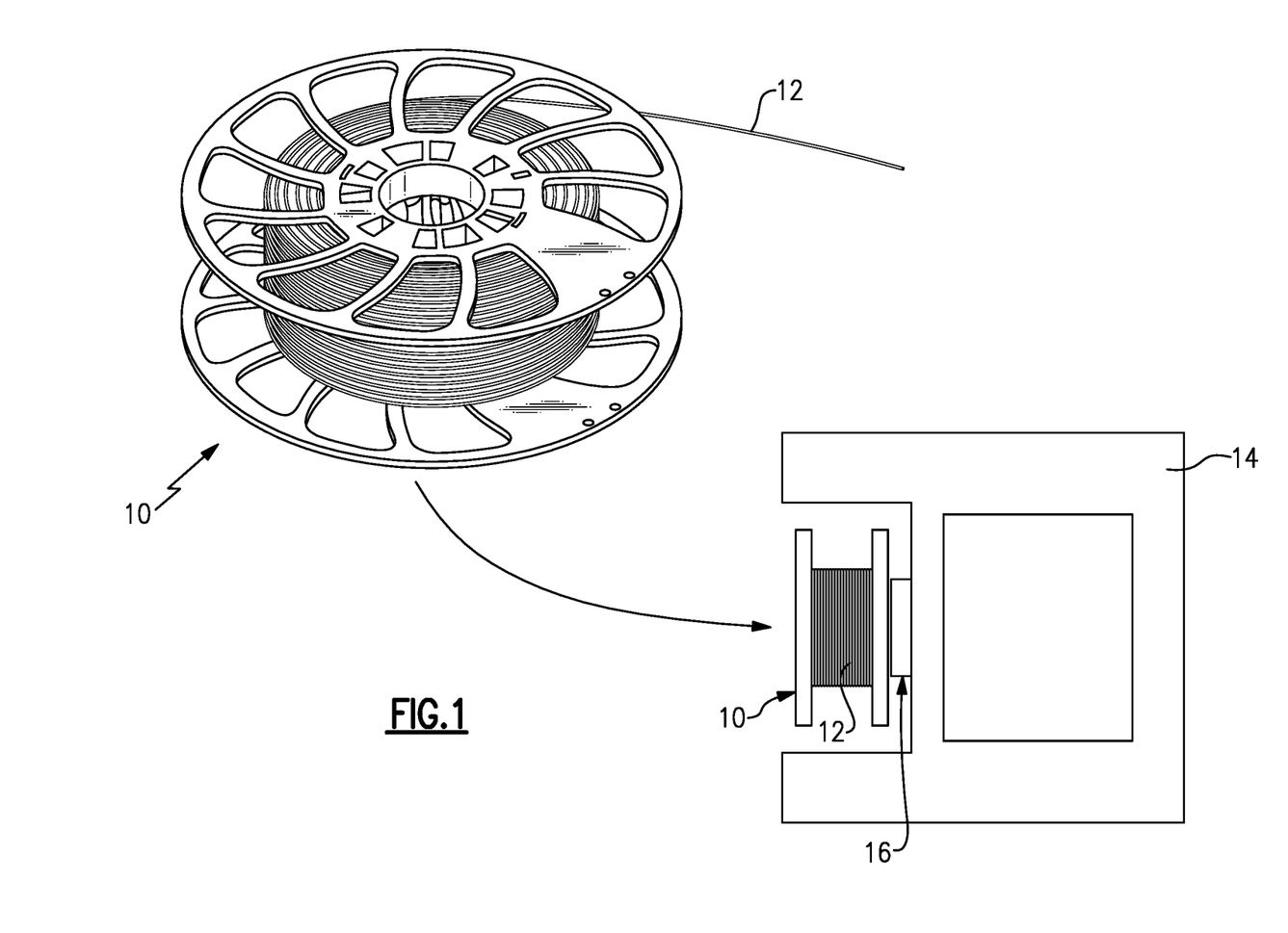
FIG. 1 is a schematic illustration of an example expandable spool and 3D-printer.

FIG. 1 is a schematic view of an example 3D printing machine 14 and spool 10. The example spool 10 is configured to be mounted to a drive hub 16 of the 3D printer machine 14. The spool 10 holds a quantity of filament 12 that is fed into a workspace of the 3D printing machine 14. The drive hub 16 on the 3D printing machine 14 may vary with different manufacturers and model of machine. Moreover, the amount of filament 12 that is utilized for a particular job or that is compatible with a specific 3D printing machine may vary by manufacturer and model of machine. Although a spool 10 for filament 12 used in a 3D printing machine is disclosed by way of example, the example spool 10 could be utilized for other materials mounted to a spool. Additionally, one skilled in the art would understand that other spooled materials would benefit from the disclosed spool 10.

Figure 2:
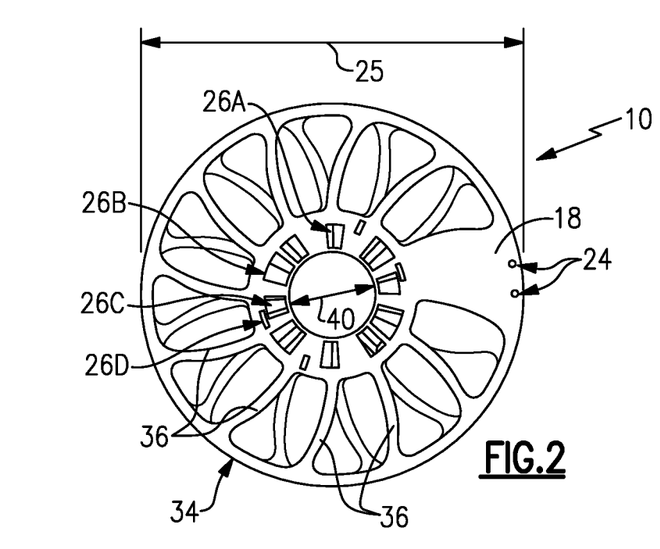
FIG. 2 is a side view of the example spool.
Figure 3:
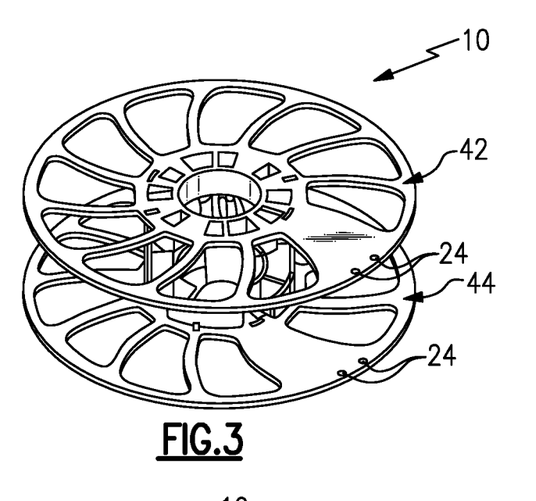
FIG. 3 is a perspective view of the example spool.
Figure 4:
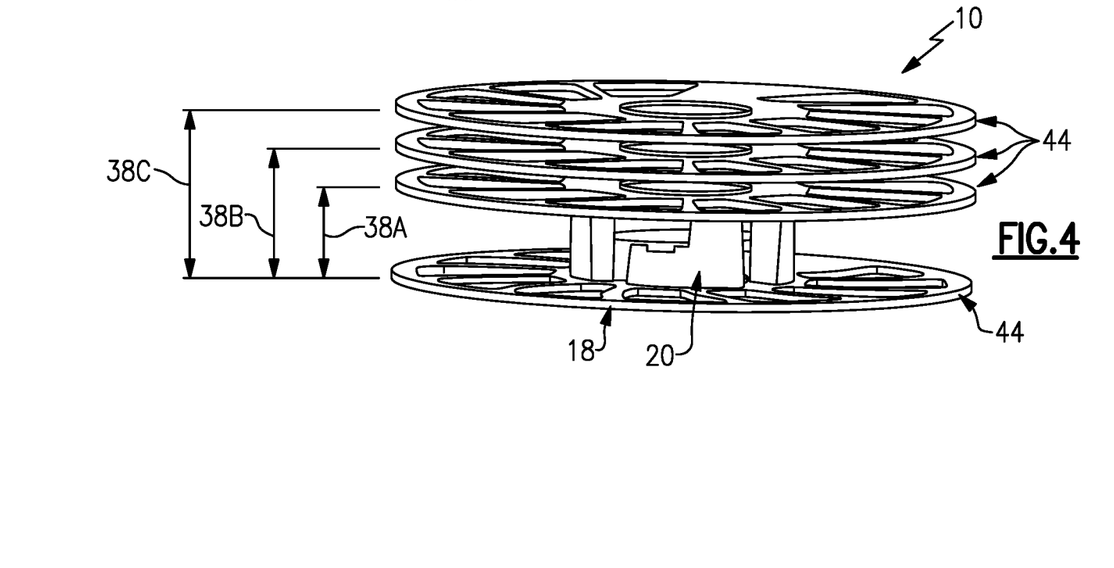
FIG. 4 is a schematic view of the example expandable spool in several different configurations.

Referring to FIGS. 2, 3 and 4, the example spool 10 is expandable to accommodate different quantities of filament 12. The example expandable spool 10 includes two identically parts attached to each other. Each of the identical parts includes a hub 20 and flange 18.

The hub 20 includes a hub diameter 40 and a flange 18 extends radially outward from the hub 20 to a flange diameter 25. The flange 18 includes a plurality of ribs 36 that extend outward from the hub towards a rim 34. The hub 20 includes a plurality of drive openings that correspond with drive components for a 3D printing machine. The example spool 10 includes multiple variations and sizes of drive openings to enable use of the example spool 10 with many different machines and drive connecting configurations. The specific configuration of the drive openings could be modified to adapt to other machine and spool support devices.

In this example, the drive openings 26a, 26b, 26c and 26d are all of different shapes and sizes that correspond with specific drive members for each different 3D printing machine. The flange 18 also includes termination openings 24 that hold portions of the filament 12 during shipment and storage.

The expandable spool 10 is expandable to vary an interior width between the flanges 18 from a first width 38a to a second width 38b and to a third width 38c. In this example, a first part 44 is selectively engageable to a second part 42 to define the interior width 38a, 38b and 38c.

Figure 5:
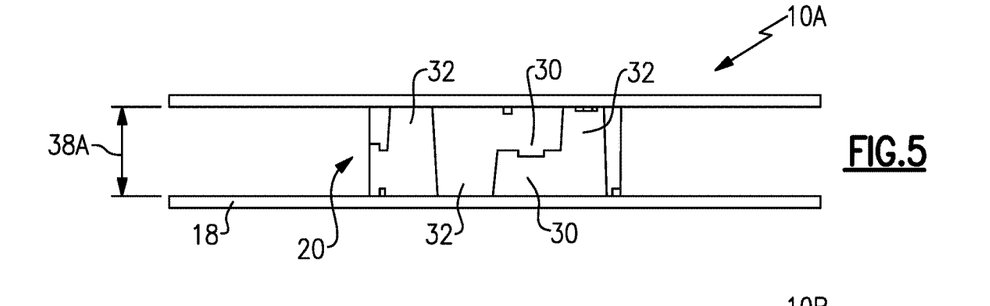
FIG. 5 is a side view of the example spool in a first configuration.
Figure 6:
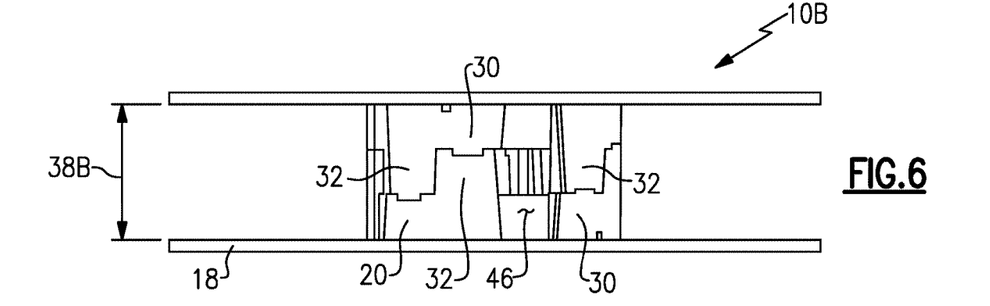
FIG. 6 is a side view of the example spool in a second configuration.
Figure 7:
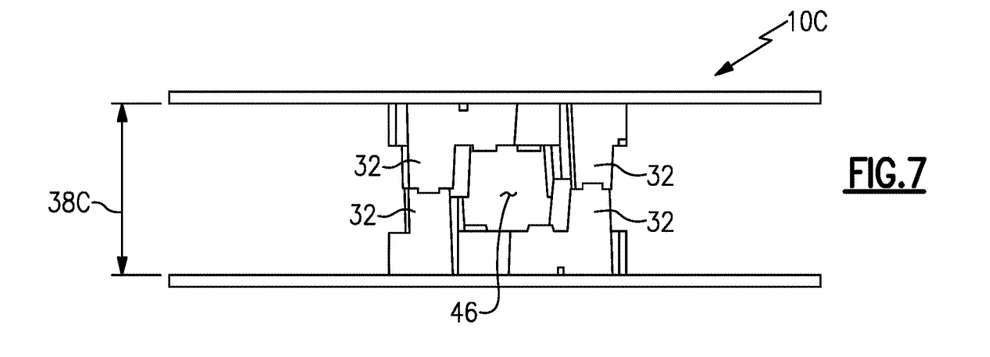
FIG. 7 is a side view of the example spool in a third configuration.
Figure 8:
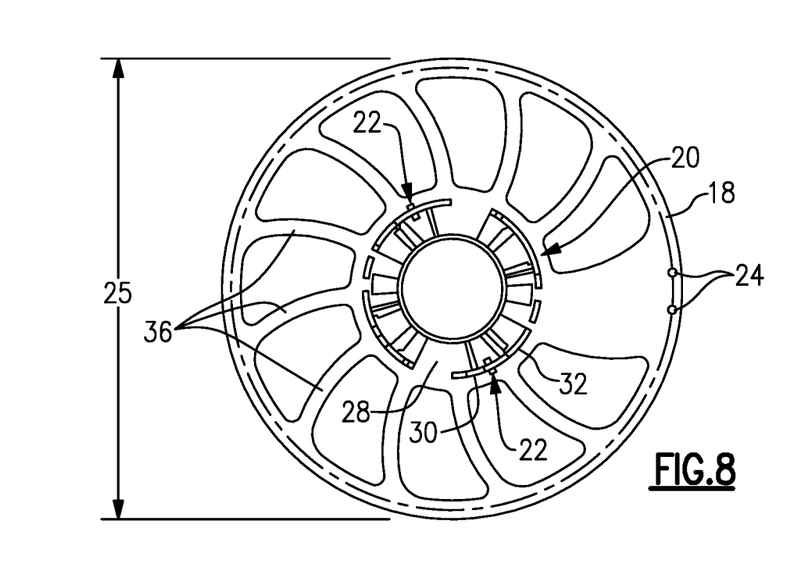
FIG. 8 is a top view of one part of the example expandable spool.
Figure 9:
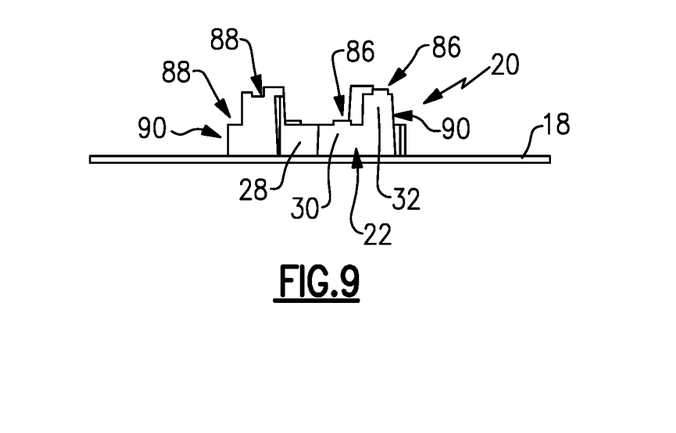
FIG. 9 is a side view of one section of the expandable spool.
Figure 10:
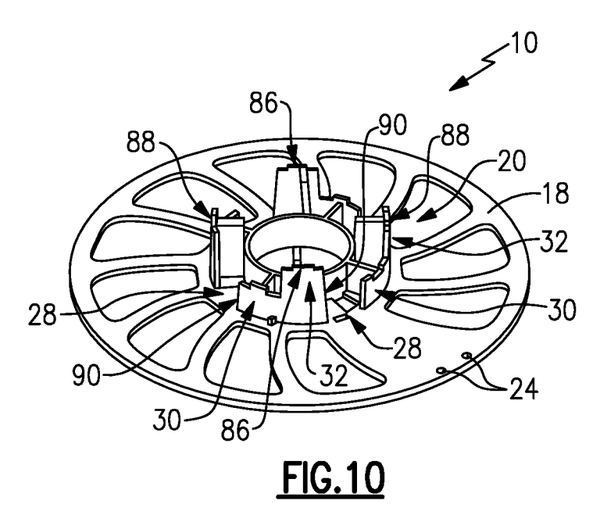
FIG. 10 is a perspective view of one portion of the expandable spool.
Figure 11:
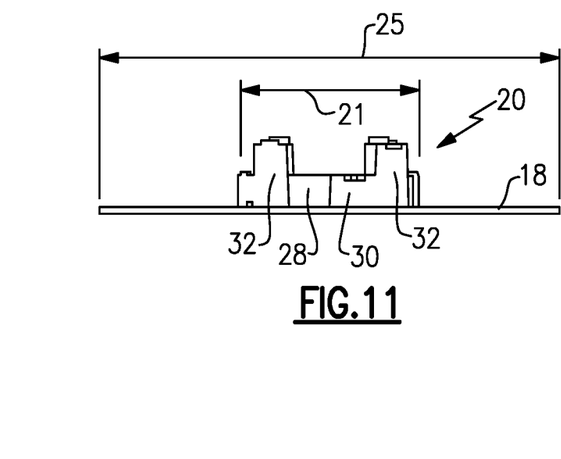
FIG. 11 is another side view of another example spool embodiment.
Figures 12, 13:
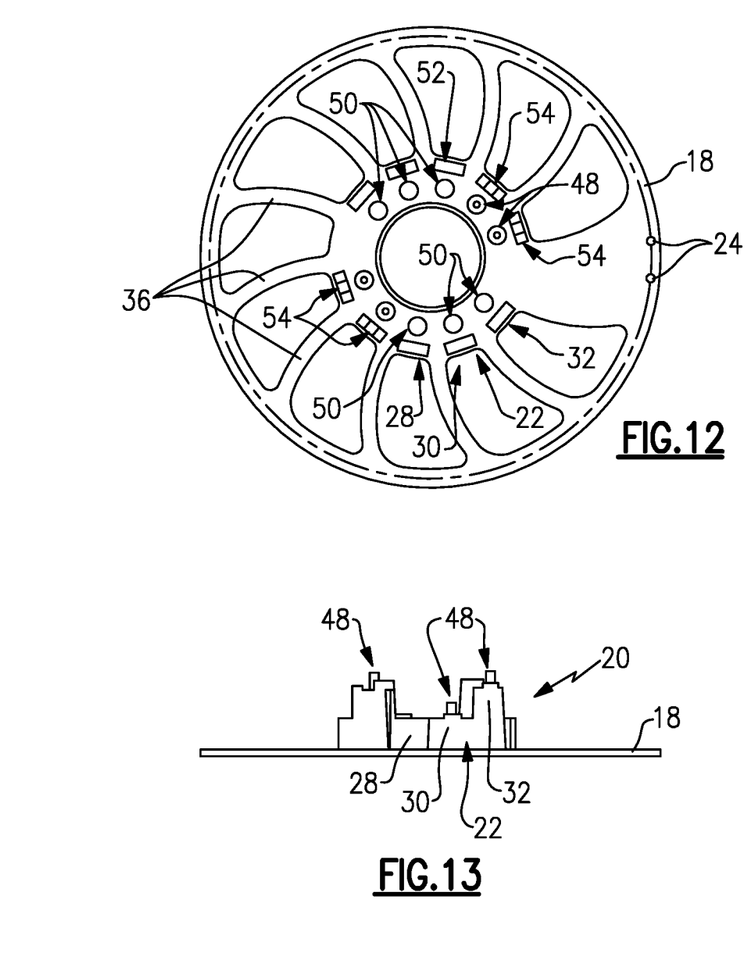
FIG. 12 is a top view of one part of the additional embodiment of the example expandable spool.
FIG. 13 is a side view of one section of the additional expandable spool embodiment.
Figure 14:
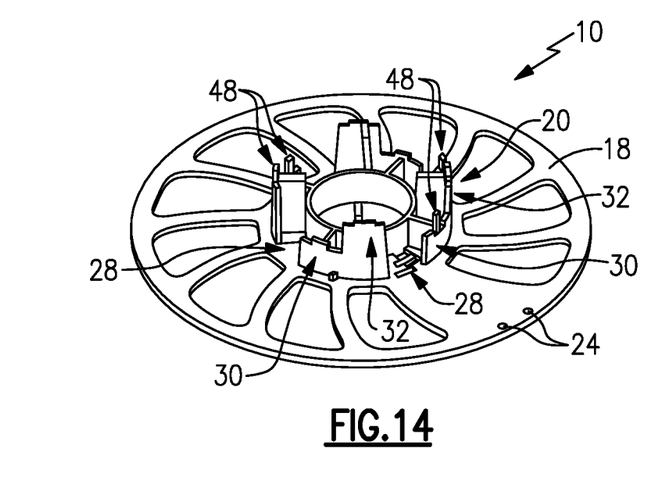
FIG. 14 is a perspective view of one portion of the additional expandable spool embodiment.
Figure 15:
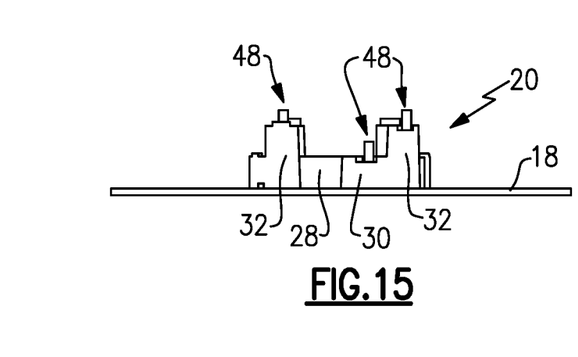
FIG. 15 is another side view of the example additional example spool embodiment.

Referring to FIGS. 5, 6 and 7 with continued reference to FIGS. 2-4, the hubs 20 include a first interlocking portion 28, a second interlocking portion 30 and a third interlocking portion 32. Each of the first, second and third interlocking portions are engageable with each other to define the various interior widths. Moreover, each of the first, second and third portions include a locking tab that securely holds the two parts 42, 44 together.

FIG. 5 illustrates a configuration where the interior width 38a is at its smallest. In this configuration, the third interlocking portion 32 is engaged with the first interlocking portion 28 and each of the second interlocking portions 30 are engaged to each other.

Referring to FIG. 6, an intermediate width 38b is illustrated where the third interlocking portion 32 is engaged to the second interlocking portions 30 and each of the first interlocking portions 28 are left to define a space 46. As appreciated, the interlocking portions are incrementally repeated around the diameter of the hub 20 such that rotation between the first portion 42 and the second portion 44 will selectively align each of the interlocking portions to provide the desired width.

In the configuration shown in FIG. 6, the third interlocking portion 32 is orientated relative to the third interlocking portion 32 of the top part 42 such that the third interlocking portion 32 engages the second interlocking portion 30. This configuration repeats around the diameter of the hub to provide a desired locking fit.

Referring to FIG. 7, the expandable hub 10c is shown in the largest width orientation. In this orientation, the first interlocking portion 28 and the second interlocking portion 30 are not engaged to each other. Instead, the third interlocking portions are engaged to each other around the diameter to provide the largest interior width 38c to hold the most amount of filament.

Referring to FIGS. 8, 9, 10 and 11, one portion of the expandable hub 10 is illustrated and shows the interior features of the first, second and third interlocking portions 28, 30 and 32. As is shown, the first, second and third interlocking portions 28, 30 and 32 repeat circumferentially around the hub 20 such that four of each of the interlocking portions 28, 30 and 32 are provided in the hub 20. In other words, there are four spaces 28, four interlocking portions 30 and four interlocking portions 32. Each of the interlocking portions are interlocking with a corresponding interlocking portion of a second part set to provide the desired different width to hold different amounts of filament.

The disclosed interlocking portions are formed as castellations formed across a grouping of interlocking portions 28, 30, 32. The castellations include an outward extending tab 86 on one side that is received within a corresponding groove 88 of another interlocking portion 28, 30, 32. Additionally, sides of the grouping of interlocking portions 28, 30, 32 include a taper 90 to facilitate connection. The taper 90 provides an increase in width in a direction toward the corresponding one of the first and second flange 18.

The hub 20 includes an outer diameter 21 that sets the initial surface and diameter for wrapping of filament or other material about the spool 10. The outer diameter 21 of the spool 20 could be of any size to correspond with a specific use. Moreover, the size of each of the interlocking portions 28, 30 and 32 would be a compatible size to the diameter 21 such that the interlocking portions 28, 30 and 32 would be scaled to the size of the diameter 21.

The flange diameter 25 may also be of any size as required to provide sufficient space and support for material wound onto the spool. The flange diameter 25 may be as large or small as required. In one example numerical embodiment, the flange diameter 25 is between about 0.5 inches and 20 inches. In other embodiment the flange diameter 25 is between about 4 and 24 inches.

Moreover, in one example embodiment, the hub diameter is from 0.25 inches to about 15 inches depending on the specific need. In another embodiment, the hub diameter 21 is between 1 inch and 8 inches. The diameter 21 of the hub is set to enable material supported on the spool to return to a normal relaxed state once removes from the spool. A hub diameter 21 that is too small can create undesired curling and deformation. A properly sized hub diameter 21 provides for the stored filament, wire or other wound material to return to a non-deformed naturally substantially linear condition. The example hub diameter 21 may be of any size.

Referring to FIGS. 12, 13, 14 and 15, another example spool embodiment is shown that includes posts 48 that are received within corresponding openings 50 to attach the two spool halves together. As in the previous embodiment, the first, second and third interlocking portions 28, 30 and 32 repeat circumferentially around the hub 20 such that there are four of each structure provided in the hub portion. Accordingly, there are four spaces 28, four interlocking portions 30 and four interlocking portions 32. The interlocking portions 28, 30, and 32 are attached using a post 48 received into a corresponding hole 50. The posts 48 are round and are received within a corresponding hole 50 to secure the spool halves together.

Each of the posts 48 is set next to a tab 54 that fits within a slot 52 adjacent to each hole 50. The posts 48 and holes 50 may provide a light interference fit to maintain the connection between spool halves. An adhesive may be utilized to attach the two spool halves to together prior to winding of the filament. It should be appreciated, that although round posts 48 and holes 50 are illustrated, that other shapes include square, oval, and irregular shapes may also be utilized and are within the contemplation of this disclosure. Oval and irregular shapes could be utilized to increase surface area for the fit. Moreover, an irregular shape could be utilized to define a set orientation of adjoining spool parts.

Each of the interlocking portions are interlocking with a corresponding interlocking portion of a second part set to provide the desired different width to hold different amounts of filament.

Figure 16:
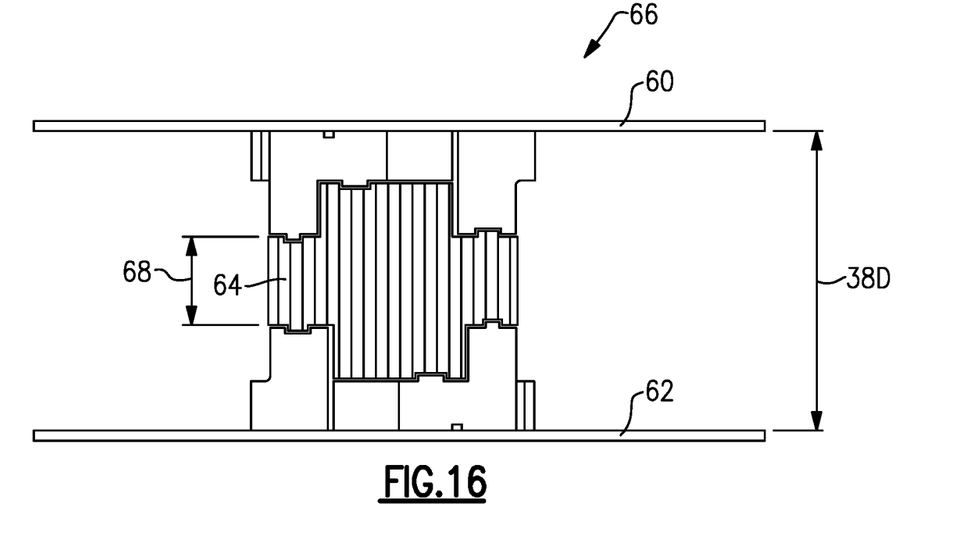
FIG. 16 is yet another example spool embodiment.

Referring to FIG. 16, another disclosed expandable spool embodiment 66 includes a first spool part 60 and a second spool part 62. The first spool part 60 and the second spool part 62 are in this example like the previous disclosed embodiments. An extension 64 is included that attaches between the first spool part 60 and the second spool part 62. The extension 64 enables additional widths 38D between the spool parts 60, 62. The example extension 64 is secured to each of the spool parts 60, 62 to define the desired width 38D. The width 38D may vary depending on a width 68 of the extension 64. The extension 64 may be attached to the tabs on each of the spool parts 60, 62 and secured with an adhesive or with a plastic welding process or another mechanical means. The example extension 64 includes features that engage the corresponding attachment features in each of the spool parts 60, 62.

Figure 17A:
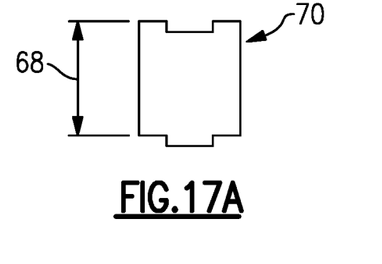
FIG. 17A is a schematic view of an extension for the example spool embodiment shown in FIG. 16.
Figure 17B:
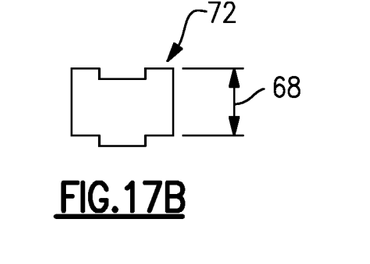
FIG. 17B is a schematic view of another extension for the example spool of the embodiment shown in FIG. 16.

Referring to FIGS. 17A and 17B with continued reference to FIG. 16, the width 38D may be adjusted by utilizing extensions 64 of different widths. An extension 70 could be utilized to provide a large width, and a smaller extension 72 could be utilized to provide a smaller width. It should be understood that many different width are possible by using extensions of varying widths. Moreover, although the example extensions 64, 70 and 72 comprise single piece, the extensions 64, 70 and 72 may comprises several parts that engage different legs to provide the desired spool width.

Figure 18:
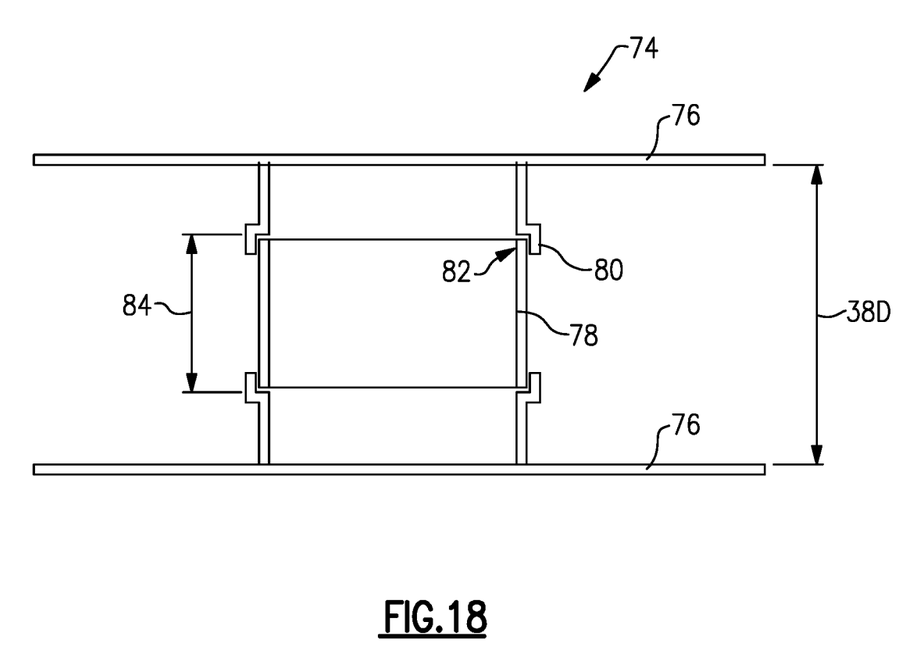
FIG. 18 is a side view of another example spool embodiment.

Referring to FIG. 18, another expandable spool 74 is shown and includes first and second identical portions 76 that include a hub 80 that receives a tube 78. The hub 80 defines an internal shoulder 82 that supports ends of the tube 78. The tube 78 includes a length 84 that enables expansion of the spool 74 to any overall width 38D. The width 38D may be varied to accommodate the desired amount of filament or other material.

Accordingly, the various disclosed spool embodiments include features enabling expansion and adjustment for adaptation to different needs and quantities of material.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An expandable spool comprising:
a first flange;
a first hub extending from the first flange and including a first plurality of interlocking portions;
a second flange;
a second hub extending from the second flange and including a second plurality of interlocking portions, wherein the first plurality of interlocking portions on the first hub are selectively connectable to the second plurality of interlocking portions on the second hub to define a spacing between the first flange and the second flange for holding material on the spool, wherein each of the first hub and the second hub include at least two drive openings of different shapes for receiving drive members of differing shapes.

2. The expandable spool as recited in claim 1, wherein each of the first plurality of interlocking portions and the second plurality of interlocking portions include a first interlocking portion, a second interlocking portion and a third interlocking portion.

3. The expandable spool as recited in claim 1, wherein the first hub and the second hub are identically configured.

4. The expandable spool as recited in claim 1, wherein at least one of the first, second and third interlocking portions includes at least one tab for holding the first hub to the second hub.

5. The expandable spool as recited in claim 1, wherein at least one of the first, second and third interlocking portions include a post that is received within a corresponding opening for holding the first hub to the second hub.

6. The expandable spool as recited in claim 5, including an adhesive applied between the post and opening to secure the first hub to the second hub.

7. The expandable spool as recited in claim 5, wherein the at least one opening comprises one of an oval, round and rectilinear shape and the post comprises a shape corresponding to the at least one opening.

8. The expandable spool as recited in claim 1, including an extension connectable between the first hub and the second hub to at least partially define the spacing between the first flange and the second flange.

9. The expandable spool as recited in claim 8, wherein the extension includes a first end including a third plurality of interlocking portions and a second end including a fourth plurality of interlocking features, wherein the third and fourth interlocking portions are selective connectible to the first and second plurality of interlocking portions.

10. The expandable spool as recited in claim 8, wherein the extension comprises a tube attached to the first hub and the second hub to space the first flange apart from the second flange.

11. The expandable spool as recited in claim 1, wherein the extension includes a hub for receiving a tube to extend the spacing between flanges.

12. The expandable spool as recited in claim 11, wherein the extension comprises a first extension with a first hub receiving a first end of the tube and a second extension including a second hub receiving a second end of the tube.

13. The expandable spool as recited in claim 1, including a mechanical fastener securing the first hub to the second hub.

14. The expandable spool as recited in claim 1, wherein each of the first plurality and second plurality of interlocking portions include mating castellations.

15. An expandable spool comprising:
a first flange;
a first hub extending from the first flange and including a first plurality of interlocking portions;
a second flange;
a second hub extending from the second flange and including a second plurality of interlocking portions, wherein the first plurality of interlocking portions on the first hub are selectively connectable to the second plurality of interlocking portions on the second hub to define a spacing between the first flange and the second flange for holding material on the spool, wherein each of the first and second plurality of interlocking portions include tapered sides that increase in width in direction toward the corresponding one of the first and second flange.

16. An expandable spool comprising:
a first flange;
a first hub extending from the first flange and including a first plurality of castellations;
a second flange;
a second hub extending from the second flange and including a second plurality of castellations, wherein the first plurality of castellations on the first hub are selectively connectable to the second plurality of castellations on the second hub to define a spacing between the first flange and the second flange for holding material on the spool, wherein each of the first plurality of castellations and the second plurality of castellations include an outward extending tab disposed along a surface defining an inner diameter of the corresponding one of the first hub and the second hub.

17. The expandable spool as recited in claim 16, wherein first plurality of castellations and the second plurality of castellations include a tapered surface that increase in width in direction toward the corresponding one of the first and second flange.

18. The expandable spool as recited in claim 17, wherein the outward extending tab is disposed on the tapered surface.

19. The expandable spool as recited in claim 18, wherein the plurality of first castellations and the plurality of second castellations include a groove defined at an end of the tapered surface for receiving a corresponding tab.

20. The expandable spool as recited in claim 19, wherein the first hub and the second hub include a first drive opening having a first shape and a second drive opening having second shape different than the first shape.

* * * * *